United States Patent
Grundmann et al.

(10) Patent No.: US 10,389,181 B1
(45) Date of Patent: Aug. 20, 2019

(54) PLANAR LOW-LOSS ELECTROMAGNETIC RESONATOR

(71) Applicant: X Development LLC, Mountain View, CA (US)

(72) Inventors: Michael Grundmann, San Jose, CA (US); Gabriella Levine, New York, NY (US)

(73) Assignee: X Development LLC, Mountain View, CA (US)

( * ) Notice: Subject to any disclaimer, the term of this patent is extended or adjusted under 35 U.S.C. 154(b) by 344 days.

(21) Appl. No.: 15/354,482

(22) Filed: Nov. 17, 2016

(51) Int. Cl.
  *H02J 50/12* (2016.01)
  *H02J 7/02* (2016.01)

(52) U.S. Cl.
  CPC .............. *H02J 50/12* (2016.02); *H02J 7/025* (2013.01)

(58) Field of Classification Search
  CPC .................................. H02J 50/12; H02J 7/025
  See application file for complete search history.

(56) References Cited

U.S. PATENT DOCUMENTS

| | | | | |
|---|---|---|---|---|
| 6,093,997 A * | 7/2000 | Zimnicki | ............... | H01L 41/053 310/345 |
| 6,198,450 B1 * | 3/2001 | Adachi | ................ | H01Q 9/0485 343/753 |
| 6,445,271 B1 * | 9/2002 | Johnson | .............. | H01F 17/0033 257/531 |
| 6,480,086 B1 * | 11/2002 | Kluge | ................. | H01F 17/0013 257/E21.022 |
| 6,696,910 B2 * | 2/2004 | Nuytkens | ................ | H01F 27/24 336/200 |
| 6,780,360 B2 * | 8/2004 | Lange | ................. | B29C 47/0004 264/127 |
| 9,396,865 B1 * | 7/2016 | Folker | ................. | H01F 27/2804 |
| 2001/0039729 A1 * | 11/2001 | Ross | ................. | H01L 23/49822 29/852 |
| 2005/0244621 A1 * | 11/2005 | Arai | ..................... | H05K 3/0038 428/209 |

(Continued)

OTHER PUBLICATIONS

Plounnis,"Rexolite (Cross Linked Polystyrene)" Mar. 2015, Scrap Monster, pp. 1-5 (Year: 2015).*

(Continued)

*Primary Examiner* — Pinping Sun
(74) *Attorney, Agent, or Firm* — McDonnell Boehnen Hulbert & Berghoff LLP

(57) ABSTRACT

The present disclosure relates to electromagnetic resonator antennas and methods for their manufacture. An example electromagnetic resonator antenna includes a first substrate and a first metal layer disposed on the first substrate. The first metal layer includes copper. The antenna also includes a dielectric layer disposed on the first metal layer. The dielectric layer includes a polarizable electrical insulator. The antenna additionally includes a second metal layer disposed on the dielectric layer. The second metal layer includes copper. The antenna yet further includes a second substrate disposed on the second metal layer and a feed line electrically coupled to at least one of the first metal layer or the second metal layer. At least one aspect of at least one of the first metal layer, the dielectric layer, or the second metal layer is selected based on a desired resonance frequency.

20 Claims, 6 Drawing Sheets

(56) References Cited

U.S. PATENT DOCUMENTS

| | | | | |
|---|---|---|---|---|
| 2009/0072628 A1* | 3/2009 | Cook | ............... | H01Q 7/005 |
| | | | | 307/104 |
| 2011/0117701 A1* | 5/2011 | Patti | ............... | H01L 21/76898 |
| | | | | 438/110 |
| 2012/0276854 A1* | 11/2012 | Joshi | ............... | A61N 1/37229 |
| | | | | 455/73 |
| 2013/0328164 A1* | 12/2013 | Cheng | ............... | H01L 28/10 |
| | | | | 257/531 |
| 2016/0315503 A1* | 10/2016 | Park | ............... | H02J 50/80 |

OTHER PUBLICATIONS

Sterman,"PCB Origami. Folding circuit boards into electronic products," 2013, MIT, pp. 1-75 (Year: 2013).*
Brian B. Tierney and Anthony Grbic, "Planar Shielded-Loop Resonators", arXiv: 1402.1219v1, Feb. 6, 2014.
Shyam Chandrasekhar Nambiar, "Design of a Wireless Power Transfer System using Electrically Coupled Loop Antennas", Masters Thesis, Virginia Polytechnic Institute and State University, Feb. 19, 2015.

* cited by examiner

Figure 2A  Cross Section View
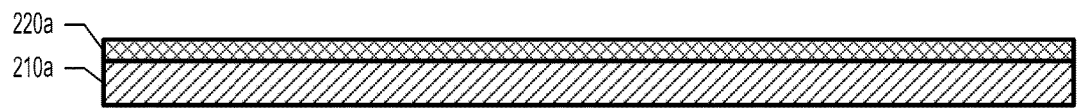
Figure 2B  Cross Section View

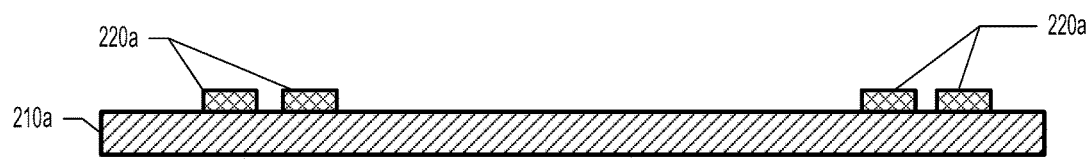
Figure 2C    Cross Section View
Figure 2D    Cross Section View

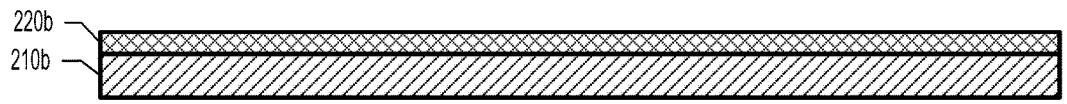
Figure 2E  Cross Section View
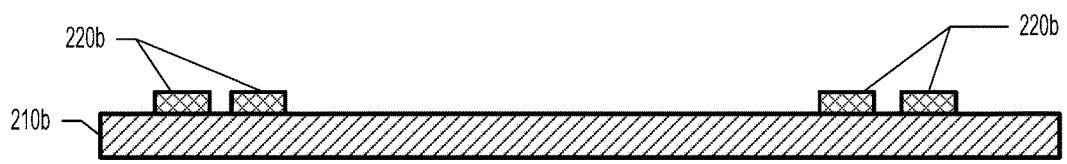
Figure 2F  Cross Section View

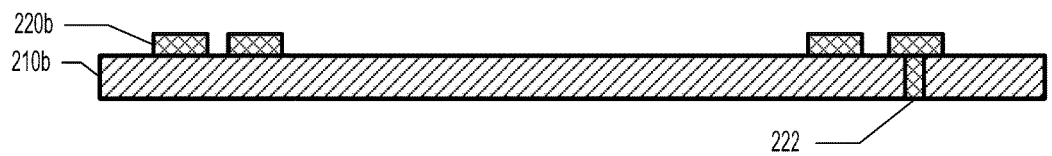
Figure 2G  Cross Section View
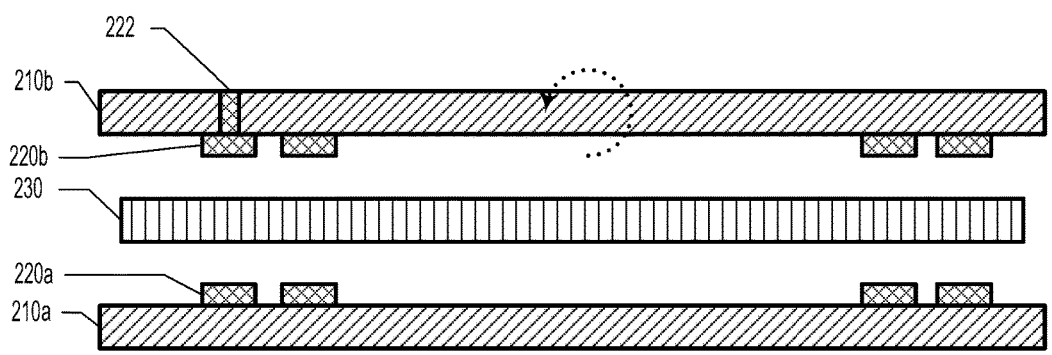
Figure 2H  Cross Section View

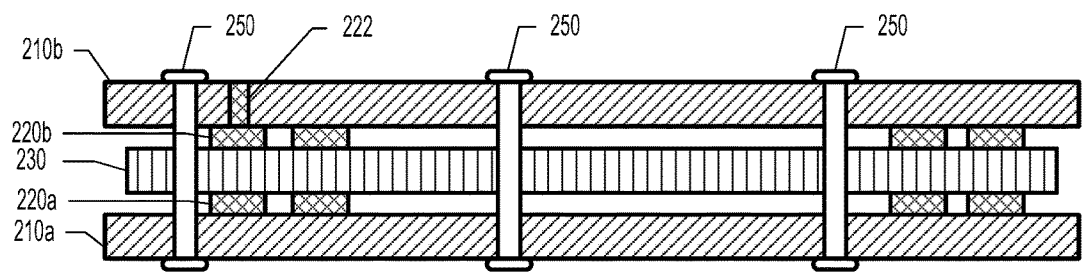
Figure 2I  Cross Section View
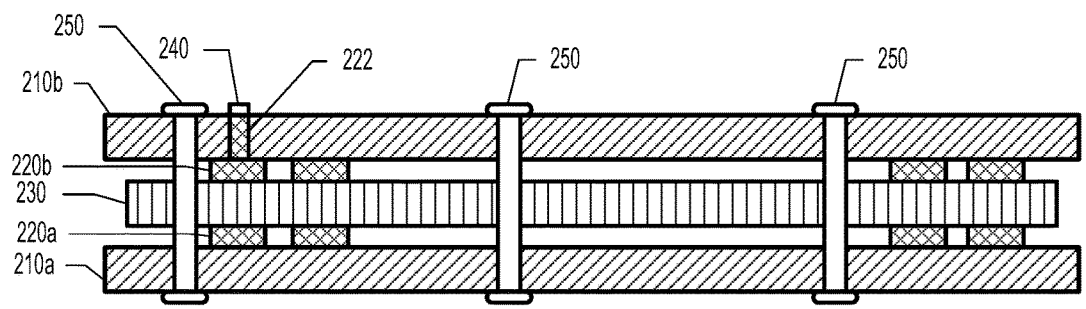
Figure 2J  Cross Section View

PLANAR LOW-LOSS ELECTROMAGNETIC RESONATOR

BACKGROUND

Unless otherwise indicated herein, the materials described in this section are not prior art to the claims in this application and are not admitted to be prior art by inclusion in this section.

Electronic devices, such as mobile phones, laptops, and tablets, have become an integral part of daily life. Other machines, such as cars, which have conventionally used non-electric power sources, are increasingly relying on electricity as a power source. As electronic devices are often mobile, it may not be feasible for devices to stay physically-connected to a power source via wires. Thus, electronic devices may use batteries to supply electric power when a device is not coupled to a power source.

Current battery technology, however, often does not meet the charge capacity and/or discharge rate demands of electronic devices, which may limit the range of moveable devices. Even in cases where batteries meet the power demands of a given device, such a device usually must be coupled to a fixed charging source via wires in order to recharge its battery. Such wired charging mechanisms may limit the movement, and thus the usability, of the device while it is being charged. Also, as the number of devices connected to a charging source increases, the number of wires in the proximity of an electrical outlet may increase, causing "cord clutter."

SUMMARY

The present disclosure generally relates to electromagnetic resonator devices and methods for their manufacture. An electromagnetic resonator device according to example embodiments may be used in conjunction with wireless power transmission systems. In particular, a resonator device may provide a compact, planar form factor and offer low loss characteristics suitable for use in a near-field resonance power transmission system. In example embodiments, various arrangements of the resonator device may be fabricated at lower cost when compared to conventional resonator devices.

In a first aspect, a device is provided. The device includes a first substrate and a first metal layer disposed on the first substrate. The first metal layer includes copper. The device also includes a dielectric layer disposed on the first metal layer. The dielectric layer includes a polarizable electrical insulator. The device additionally includes a second metal layer disposed on the dielectric layer. The second metal layer includes copper. The device yet further includes a second substrate disposed on the second metal layer and a feed line electrically coupled to at least one of the first metal layer or the second metal layer. At least one aspect of at least one of the first metal layer, the dielectric layer, or the second metal layer is selected based on a desired resonance frequency.

In a second aspect, a method of manufacture of an antenna is provided. The method includes forming a first metal layer on a first substrate and forming a second metal layer on a second substrate. The first metal layer and the second metal layer include copper. The method also includes providing a dielectric layer between the first substrate and the second substrate. The first metal layer and the second metal layer are proximate to the dielectric layer. The dielectric layer includes a polarizable electrical insulator. At least one aspect of at least one of the first metal layer, the dielectric layer, or the second metal layer is selected based on a desired resonance frequency. The method further includes coupling the first substrate, the dielectric layer, and the second substrate.

Other aspects, embodiments, and implementations will become apparent to those of ordinary skill in the art by reading the following detailed description, with reference where appropriate to the accompanying drawings.

BRIEF DESCRIPTION OF THE FIGURES

FIG. 2A illustrates a portion of a method of manufacture, according to an example embodiment.

FIG. 2B illustrates a portion of a method of manufacture, according to an example embodiment.

FIG. 2C illustrates a portion of a method of manufacture, according to an example embodiment.

FIG. 2D illustrates a portion of a method of manufacture, according to an example embodiment.

FIG. 2E illustrates a portion of a method of manufacture, according to an example embodiment.

FIG. 2F illustrates a portion of a method of manufacture, according to an example embodiment.

FIG. 2G illustrates a portion of a method of manufacture, according to an example embodiment.

FIG. 2H illustrates a portion of a method of manufacture, according to an example embodiment.

FIG. 2I illustrates a portion of a method of manufacture, according to an example embodiment.

FIG. 2J illustrates a portion of a method of manufacture, according to an example embodiment.

DETAILED DESCRIPTION

Figure 1:
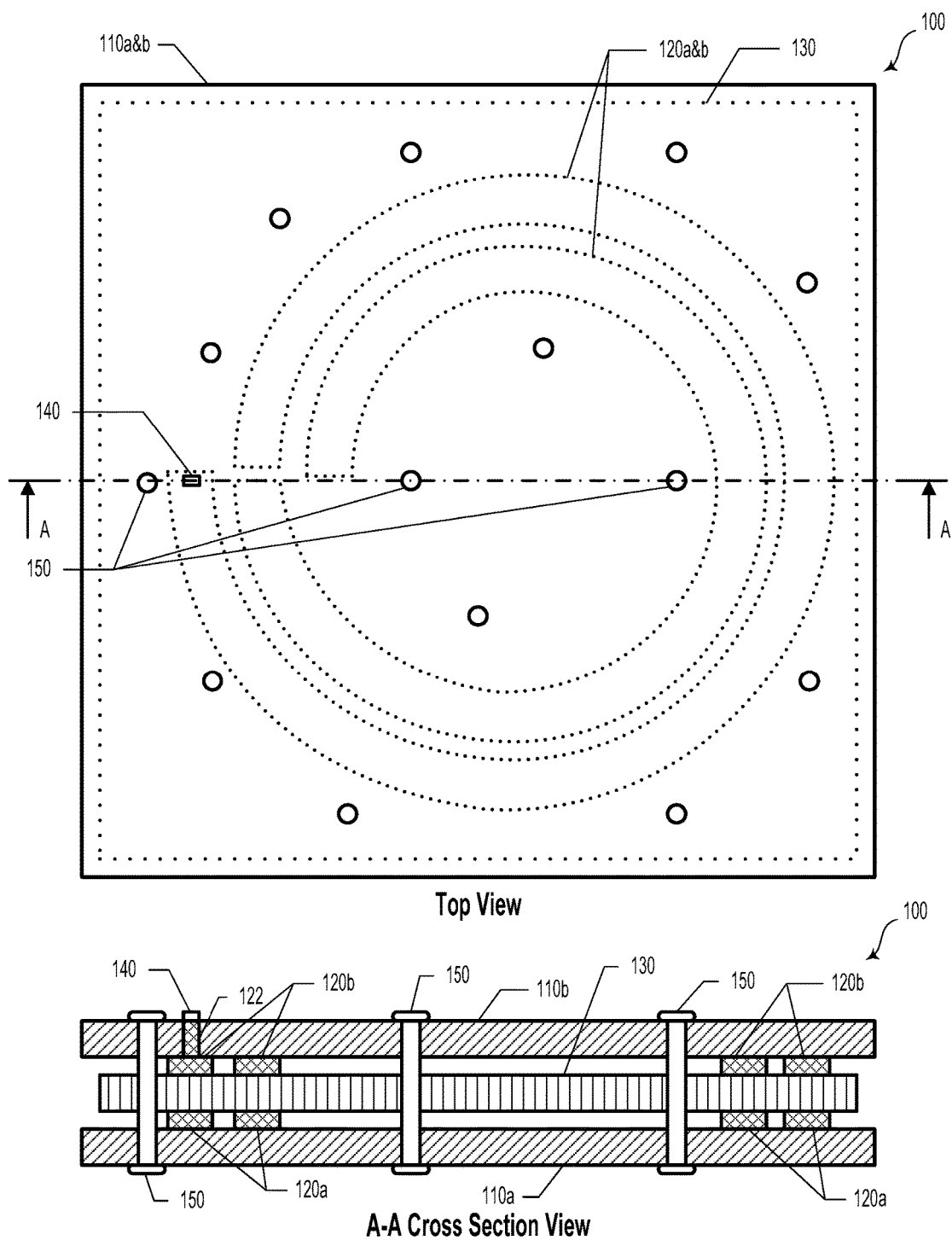
FIG. 1 illustrates a device, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

Low-loss, low-cost antennas may be utilized in wireless power transfer systems. When a large amount of electromagnetic energy is stored in an antenna, the antenna loss figure becomes important. Namely, the power transfer efficiency in a resonant wireless power transfer system is based, in substantial part, on the antenna loss. Loss in an antenna can arise from a variety of factors including dielectric loss and conductive loss.

Conductive losses in antennas can be controlled by using high conductivity antenna metals, such as copper. Furthermore, antennas with large conductive pathways (e.g., large cross-sectional and/or surface area) may minimize conductive losses. Additionally, copper can be coated with another metal like gold that is non-reactive to reduce the formation of low-conductivity oxides.

Constructing a planar antenna directly on a low-loss substrate, such as Rexolite (a cross-linked polymer) may help to control dielectric loss. Teflon is a desirable dielectric material, however, metal adheres poorly to it. For compatibility with low-cost fabrication methods, most board manufacturers use expensive ceramic substrates. Typical FR-4 printed circuit board material exhibits high dielectric loss that may substantially affect efficiency if used as a substrate.

In the present disclosure, planar resonant antenna designs that can help to address both conductive and dielectric loss mechanisms are described. The electromagnetic fields associated with such an antenna can be substantially confined to a low-loss dielectric material (e.g., Rexolite or Teflon) that is sandwiched between high-conductivity metal layers. The metal layers can be constructed by inexpensive methods on inexpensive substrates (e.g., FR-4), and those inexpensive substrates are kept substantially out of the high electromagnetic field regions.

In example embodiments, a physical layer order (e.g., stacking order) may include: FR-4, copper, gold, Teflon, gold, copper, FR-4, and the structure may be mechanically fastened with screws or a mechanical bracket, and/or some or all layers may be glued together with an adhesive. In some embodiments, the gold layers are optional.

In such a scenario, conductive metal layers on the board may act as both a distributed capacitor and a distributed inductor. In an example embodiment, the conductive metal layers may form one or more coils, which may spatially overlay one another. The electric field for the capacitor is constrained to the low-loss dielectric by the design of the transmission line defined by the two metal layers. The width of the transmission line may influence the conductive loss.

Additionally, the coils may form an inductor that distributes a magnetic field, which may be utilized in a wireless power transfer scheme. The distributed inductance and capacitance may be tuned and/or adjusted by the width of the conductors, the thickness of the dielectric, the number of coils, the diameter of the coils, and other features (e.g., split positions in the metal coils, etc.). The conductors may be bridged on an outer side of one of the substrates. The inductance and capacitance of the antenna define the resonant frequency of the resonator. In example embodiments, resonator antennas may be provided with a center frequency of 13.56 MHz and Q of greater than 300.

II. Example Systems

FIG. 1 illustrates a device 100 in top and cross-section views, according to an example embodiment. The device 100 may be an electromagnetic resonator antenna suitable for use in a resonant wireless energy transfer system. The device 100 includes a first substrate 110a, a second substrate 110b, a first metal layer 120a, a second metal layer 120b, and a dielectric layer 130. In an example embodiment, the first metal layer 120a is disposed on the first substrate 110a. The dielectric layer 130 is disposed on the first metal layer 120a. In an example embodiment, the dielectric layer 130 includes a polarizable electrical insulator. The second metal layer 120b is disposed on the dielectric layer 130. In such a scenario, the first metal layer 120a and the second metal layer 120b may include copper. In some embodiments, the first metal layer 120a and/or the second metal layer 120b may additionally or alternatively include other materials, such as silver, gold, or another conductive material. As an example, the respective metal layers 120a and 120b may be coated with gold (e.g., an electroless gold plating surface finish). The second substrate 110b is disposed on the second metal layer 120b.

In an example embodiment, the first substrate 110a and the second substrate 110b may include respective printed circuit boards (PCBs). For example, the PCBs may include a woven fiberglass cloth with an epoxy resin binder. In an example embodiment, the PCBs may be made from FR-4 glass-reinforced epoxy laminate materials. It is understood that a wide variety of low cost materials are contemplated for the first substrate 110a and the second substrate 110b. For example, other such substrate materials may include glass, wood, ceramics, or other plastics.

The dielectric material 130 may include a low-loss dielectric material such as a cross-linked polystyrene (e.g., REXOLITE from Aetna Plastics), polyether ether ketone (PEEK), or ultra-high-molecular-weight polyethylene. Additionally or alternatively, the dielectric material 130 may include polytetrafluoroethylene (e.g., PTFE or TEFLON by Chemours). In an example embodiment, the dielectric material 130 may have a relative permittivity $\varepsilon_r$ between 2 and 3 at 1 kHz. Furthermore, the dielectric material 130 may have a dielectric strength of between 19 and 173 MV/m. In some embodiments, the dielectric material 130 could additionally or alternatively include air, another gas (e.g., sulfur hexafluoride $SF_6$), or vacuum. In such scenarios, spacers may be introduced into a gap between the respective metal layers 120a and 120b. The spacers may include an insulating and/or dielectric material configured to maintain a desired spacing between the respective metal layers 120a and 120b.

In some embodiments, at least some of the respective layers of device 100 may be aligned to one another. For example, the first metal layer 120a, the dielectric layer 130, and the second metal layer 120b may be aligned to one another. The alignment may be provided by an alignment pin that passes through each layer. Additionally or alternatively, alignment may be provided by a fiducial mark or a mechanical bracket.

In an example embodiment, at least some of the layers of device 100 may be fastened or otherwise coupled together. As an example, the first substrate 110a, the first metal layer 120a, the dielectric layer 130, the second metal layer 120b, and the second substrate 110b may be attached to one another with at least one of: a fastener, a mechanical bracket, a clamp, or an adhesive. It will be understood that other ways to couple the respective layers of device 100 are possible. For example, the first metal layer 120a and the second metal layer 120b could be deposited directly (e.g., via evaporation, electroplating, or sputtering) on the respective first and second substrates 110a and 110b. In an example embodiment, screws may be used to fasten the respective layers of device 100 via a plurality of fastener locations 150.

The device 100 may also include a feed line 140. The feed line 140 may be electrically coupled to at least one of the first metal layer 120a or the second metal layer 120b by a connection 122. The connection 122 may include a conductive material that provides an electrical connection (e.g., a through-substrate via) between the feed line 140 and the first metal layer 120a and/or the second metal layer 120b. In example embodiments, connection 122 could represent other types of vias and/or jumpers configured to electrically couple the first metal layer 120a and/or the second metal layer 120b to the feed line 140. Any combination or arrangement of such vias and/or jumpers is contemplated herein.

Feed line 140 may include a coaxial connector and/or a coaxial cable that may connect device 100 to a transceiver device. As an example, the transceiver device may be a part of a wireless energy transmission system.

While coaxial cables are described herein, it will be understood that other types of feed lines are possible. For example, feed line 140 could include a waveguide, twin line, or another type of connection or transmission line. Furthermore, while embodiments herein are described in the MHz frequency ranges (e.g., 13.56 MHz), other radio frequency ranges (e.g., 300 MHz to 3 GHz) are possible and contemplated.

At least one aspect of at least one of the first metal layer 120a, the dielectric layer 130, or the second metal layer 120b may be selected based on a desired resonance frequency, a desired capacitance value, and/or a desired inductance value. For example, the first metal layer 120a and the second metal layer 120b may be formed in substantially overlapping a spiral or loop shapes with a separation distance defined by the thickness of the dielectric material 130. In such a scenario, the inductance and capacitance of device 100 may be based on the width of the conductors in the respective metal layers 120a and 120b, the thickness of the dielectric 130, the number of coils, the diameter of the coils, and other features (e.g., split positions in the metal coils, etc.). In an example embodiment, metal layers 120a and 120b may be substantially overlapping one another. However, other metal layer patterns and arrangements (e.g. shape, metal strip width, offset, etc.) are contemplated.

In some embodiments, the planar shielded-loop resonator structure of device 100 may be adjusted to tailor various transmission line properties, such as $Z_0$. In such a structure, the inductance and capacitance are formed using the same conductive loops. As an example, the desired capacitance value and the desired inductance value may be selected based on a desired equivalent RLC circuit configuration. An inductance of the equivalent RLC circuit may be approximated by:

$$L = \mu_r \left[ \ln\left(\frac{8a}{b_0}\right) - 1.75 \right],$$

where a is the mean radius of the loop and $b_0$ is the radius of the conductor cross section.

The capacitance of the equivalent RLC circuit may be approximated by:
C=C'l, where C' is the per-unit length capacitance of the transmission line and l is the length of the transmission line.

The desired RLC circuit configuration may have one or more resonant frequencies. Based on L and C, the resonance frequency, $w_0$ may be approximated by:

$$w_0 = \frac{1}{\sqrt{LC}}.$$

As such, at least one aspect of the first metal layer 120a, the dielectric layer 130, or the second metal layer 120b is selected based further on at least one desired resonance frequency. In an example embodiment, the desired resonance frequency may be 13.56 MHz, however other resonance frequencies are contemplated.

In some embodiments, applying an in-plane and/or torsional (bending) force to the device 100 may provide control over the characteristic capacitance, inductance, and/or resonance frequency. As an example, applying a 500 N transverse (e.g., in-plane) force may change the resonance frequency by 2 MHz or more. It will be understood that in-plane and/or torsional forces may introduce small changes to the geometry of the device 100, which may adjust the resonance frequency and/or the resonance peak characteristics (e.g., full width half max (FWHM), peak shape, etc.). Other ways to dynamically tune the resonant properties of the device 100 are contemplated herein.

A quality factor for device 100 may be determined based on:

$$Q = \frac{1}{R}\sqrt{\frac{L}{C}},$$

where R is a resistance, L is an inductance, and C is a capacitance of device 100. It will be understood that other ways to determine the quality factor are possible based on, for example, a parallel, series, or combination distributed circuit analysis. In some embodiments, the device 100 may have a quality factor Q greater than 300. In example embodiments, the device 100 may have a Q greater than 1000. When paired with another resonator antenna with high Q, device 100 may provide an efficient resonator antenna suitable for use in a wireless energy transfer system. Specifically, device 100 may transmit and/or receive electrical energy via a near field resonant coupling link.

III. Example Methods of Manufacture

FIGS. 2A-2J illustrate various portions of a method for manufacturing an antenna 200, according to an example embodiment. Antenna 200 may be similar or identical to device 100 as illustrated and described with regard to FIG. 1.

FIG. 2A illustrates a portion of a method of manufacture, according to an example embodiment. As illustrated in FIG. 2A, a substrate 210a may be provided. Substrate 210a may include a common printed circuit board material, such as FR-4. In an example embodiment, the substrate 210a may have a thickness of 0.015", although other thicknesses are possible. Other types of inexpensive substrate materials are contemplated.

FIG. 2B illustrates a portion of a method of manufacture, according to an example embodiment. As illustrated in FIG. 2B, a first metal layer 220a may be formed on the first substrate 210a. As an example, the first metal layer 220a may be deposited on the first substrate 210a via an evaporation process, a sputtering process, an electroplating process, or another type of metal deposition process.

In an example embodiment, the first metal layer 220a may include copper. Furthermore, the first metal layer 220a may have a thickness of approximately 14 mils (~350 microns), however other thicknesses are possible. It will be understood that some printed circuit board materials may be obtained pre-coated with the first metal layer 220a. In some embodiments, the first metal layer 220a may further include a gold layer. For instance, gold may be plated on copper in an electroless plating process. As such, the gold coating may reduce oxidation of the first metal layer 220a.

FIG. 2C illustrates a portion of a method of manufacture, according to an example embodiment. As illustrated in FIG. 2C, the first metal layer 220a may be patterned. That is, at least some portion of the first metal layer 220a may be removed via etching, liftoff, or other subtractive methods. In an example embodiment, a resist mask (e.g., photoresist) may be applied. Subsequently, the resist mask may be exposed (e.g., via ultraviolet light) and developed. Thereafter, a metal wet or dry etch process may be utilized to remove at least a portion of the first metal layer 220a. In an example embodiment, upon etching the unmasked regions, the remaining portion of the first metal layer 220a may be shaped in a double coil or loop shape. It will be understood that other shapes are possible.

FIG. 2D illustrates a portion of a method of manufacture, according to an example embodiment. As illustrated in FIG. 2D, a second substrate 210b may be provided. The second substrate 210b may be similar to the first substrate 210a. For example, the second substrate 210b may include FR-4 or another type of substrate material. That is, the first substrate 210a and the second substrate 210b may include respective printed circuit boards formed from woven fiberglass cloth with an epoxy resin binder.

FIG. 2E illustrates a portion of a method of manufacture, according to an example embodiment. As illustrated in FIG. 2E, a second metal layer 220b may be formed on a second substrate 210b. The second metal layer 220b may be similar to the first metal layer 220a. As an example, the second metal layer 220b may include copper and may further include a gold coating.

In some embodiments, the method of manufacture may include a planarization process. The planarization process may reduce or eliminate surface topography due to the respective metal layers. For example, the planarization process may include backfilling with a dielectric material (e.g., epoxy) and/or a polishing step (e.g., a chemical-mechanical polishing (CMP) process) to planarize the epoxy/metal layer. The planarization process may additionally include a cleaning step to remove polishing slurry or other particulate matter after polishing.

FIG. 2F illustrates a portion of a method of manufacture, according to an example embodiment. As illustrated in FIG. 2F, the second metal layer 220b may be patterned via a subtractive process. In some embodiments, the second metal layer 220b may be patterned in a corresponding (e.g., mirror image) to that of the first metal layer 220a. That is, the first metal layer 220a and the second metal layer 220b may include forming corresponding metal layers in a spiral shape or a loop shape. Additionally or alternatively, the second metal layer 220b may include fewer or more structures than the first metal layer 220a.

FIG. 2G illustrates a portion of a method of manufacture, according to an example embodiment. As illustrated in FIG. 2Q a connection 222 may be formed in the second substrate 210b. As an example, the connection 222 may be formed using an electroplating process or other methods of metal deposition. While FIG. 2G illustrates a single connection 222 being formed in the second substrate 210b, it is understood that other through-substrate connections are possible. Furthermore, other similar connections may be made through the first substrate 210a. In an example embodiment, the connection 222 may provide an electrical connection from the second metal layer 220b to other elements of antenna 200. For instance, one or more connections 222 may provide a conductive bridge on an outer side of one of the first or second substrates 210a and 210b.

FIG. 2H illustrates a portion of a method of manufacture, according to an example embodiment. As illustrated in FIG. 2H, a dielectric layer 230 may be provided (e.g., inserted or deposited) between the first substrate 210a and the second substrate 210b. Namely, the first substrate 210a and the second substrate 210b may be arranged such that the first metal layer 220a and the second metal layer 220b substantially overlay one another, separated by the dielectric layer 230. In other words, the first metal layer 220a and the second metal layer 220b may be proximate to, or in intimate contact with, the dielectric layer 230. As described elsewhere herein, the dielectric layer 230 includes a polarizable electrical insulator, such as cross-linked polystyrene. Additionally or alternatively the dielectric layer 230 may include polyether ether ketone, ultra-high-molecular-weight polyethylene, or polytetrafluoroethylene (PTFE). In some embodiments, the dielectric layer 230 may be $\frac{1}{16}$" thick, however other thicknesses are possible.

FIG. 2I illustrates a portion of a method of manufacture, according to an example embodiment. As illustrated in FIG. 2I, the first substrate 210a, the second substrate 210b, the dielectric layer 230, the first metal layer 220a, and the second metal layer 220b may be coupled together with one or more fasteners, mechanical brackets, or clamps. In some embodiments, at least some of the respective layers/materials may be bonded together with an adhesive. In some embodiments, the one or more clamps or couplings may be configured to provide a controllable amount of force. In such a scenario, a resonance frequency of the antenna 200 may be controllably adjusted. In an example embodiment, the one or more clamps could be controlled with respective computer-controlled actuators.

The step of coupling the respective layers together to form antenna 200 may include aligning at least the first metal layer 220a, the dielectric layer 230, and the second metal layer 220b to one another based on at least one of: an alignment pin, a fiducial mark, or a mechanical bracket.

FIG. 2J illustrates a portion of a method of manufacture, according to an example embodiment. As illustrated in FIG. 2J, a feed line 240 may be attached to the second substrate 210b and the connection 222. In such a scenario, the feed line 240 may be electrically coupled to at least one of the first metal layer 220a or the second metal layer 220b. For example, the feed line 240 may include a sub-miniature version A (SMA) connector. In such a scenario, an inner conductor of the SMA connector could be connected to the first metal layer 220a via connection 222. Furthermore, an outer conductor of the SMA connector could be connected to metal layer 220a by a further connection (not illustrated), which could represent a via from the feedline 240 through the second substrate 210b and the dielectric layer 230. It will be understood that a variety of different arrangements and/or combinations of through-substrate-vias and/or jumpers are possible so as to electrically connect the first metal layer 220a and/or the second metal layer 220b with the feed line 240. All other such arrangements and combinations are contemplated herein.

It will be understood that at least one aspect at least one of the first metal layer 220a, the dielectric layer 230, or the second metal layer 220b may be selected based on a desired resonance frequency, a desired capacitance value, and/or a desired inductance value. That is, various shapes, sizes, widths, or other dimensions of the respective elements of antenna 200 could be adjusted and/or selected to provide the desired capacitance value and the desired inductance value. For example, a thickness of the dielectric layer 230 may be adjusted to change an actual capacitance value and/or actual inductance value of the antenna 200. Similarly, a shape of the respective metal layers 220a and 220b could be adjusted to change the actual capacitance value and/or the actual inductance value.

Furthermore, selecting the at least one aspect of the first metal layer 220a, the dielectric layer 230, and/or the second metal layer 220b may be based further on at least one desired resonance frequency. As an example, the antenna may have a resonance frequency of 13.56 MHz and a quality factor Q greater than 300.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A device comprising:
   a first substrate;
   a first metal layer disposed on the first substrate along a first plane, wherein the first metal layer comprises copper, wherein the first metal layer has a spiral or loop shape along the first plane;
   a dielectric layer disposed on the first metal layer, wherein the dielectric layer comprises a polarizable electrical insulator;
   a second metal layer disposed on the dielectric layer along a second plane that is substantially parallel to the first plane, wherein the second metal layer comprises copper, wherein the second metal layer has a spiral or loop shape along the second plane;
   a second substrate disposed on the second metal layer; and
   a feed line electrically coupled to at least one of the first metal layer or the second metal layer, wherein at least one aspect of at least one of: the first metal layer, the dielectric layer, or the second metal layer is selected based on a desired resonance frequency, wherein the first substrate, the dielectric layer and the second substrate are attached to one another by way of a plurality of mechanical attachment devices.

2. The device of claim 1, wherein a material of the dielectric layer comprises cross-linked polystyrene, polyether ether ketone, or ultra-high-molecular-weight polyethylene.

3. The device of claim 1, wherein a material of the dielectric layer comprises polytetrafluoroethylene (PTFE).

4. The device of claim 1, wherein the first substrate and the second substrate comprise respective printed circuit boards comprising woven fiberglass cloth with an epoxy resin binder.

5. The device of claim 1, wherein the spiral or loop shape of the second metal layer substantially mirrors and spatially overlays the spiral or loop shape of the first metal layer, and wherein the first and second metal layers are separated by the dielectric layer, thereby causing the first and second metal layers to define both capacitance and inductance.

6. The device of claim 1, wherein the plurality of mechanical attachment devices comprises at least one of a fastener, a mechanical bracket, or a clamp.

7. The device of claim 1, wherein at least the first metal layer, the dielectric layer, and the second metal layer aligned to one another based on at least one of: an alignment pin, a fiducial mark, or a mechanical bracket.

8. The device of claim 1, wherein the at least one aspect of the first metal layer, the dielectric layer, or the second metal layer is selected based further on at least one of a desired capacitance value or a desired inductance value.

9. The device of claim 1, wherein the device has a resonance frequency of 13.56 MHz.

10. The device of claim 1, wherein the device has a quality factor Q greater than 300.

11. A method of manufacturing an antenna, comprising:
    forming a first metal layer on a first substrate along a first plane, wherein the first metal layer is formed in a spiral or loop shape along the first plane;
    forming a second metal layer on a second substrate along a second plane, wherein the second metal layer is formed in a spiral or loop shape along the second plane, and wherein the first metal layer and the second metal layer comprise copper;
    providing a dielectric layer between the first substrate and the second substrate, wherein the first metal layer and the second metal layer are disposed on the dielectric layer, wherein the dielectric layer comprises a polarizable electrical insulator, wherein at least one aspect of at least one of: the first metal layer, the dielectric layer, or the second metal layer is selected based on a desired resonance frequency; and
    coupling the first substrate, the dielectric layer, and the second substrate by way of a plurality of mechanical attachment devices, the coupling causing the second plane to be substantially parallel to the first plane.

12. The method of claim 11, further comprising:
    electrically coupling a feed line to at least one of the first metal layer or the second metal layer.

13. The method of claim 11, wherein a material of the dielectric layer comprises cross-linked polystyrene, polyether ether ketone, or ultra-high-molecular-weight polyethylene.

14. The method of claim 11, wherein a material of the dielectric layer comprises polytetrafluoroethylene (PTFE).

15. The method of claim 11, wherein the first substrate and the second substrate comprise respective printed circuit boards comprising woven fiberglass cloth with an epoxy resin binder.

16. The method of claim 11, where the coupling further causes the spiral or loop shape of the second metal layer to substantially mirror and spatially overlay the spiral or loop shape of the first metal layer, and where the providing of the dielectric layer results in the first and second metal layers being separated by the dielectric layer, thereby causing the first and second metal layers to define both capacitance and inductance.

17. The method of claim 11, further comprising selecting the at least one aspect of the first metal layer, the dielectric layer, or the second metal layer based further on at least one of a desired capacitance value or a desired inductance value.

18. The method of claim 11, wherein the plurality of mechanical attachment devices comprises at least one of a fastener, a mechanical bracket, or a clamp.

19. The method of claim 11, further comprising aligning at least the first metal layer, the dielectric layer, and the second metal layer to one another based on at least one of: an alignment pin, a fiducial mark, or a mechanical bracket.

20. The method of claim 11, wherein the antenna has a resonance frequency of 13.56 MHz and a quality factor Q greater than 300.

* * * * *